(12) United States Patent
Abbott

(10) Patent No.: US 10,046,927 B2
(45) Date of Patent: Aug. 14, 2018

(54) APPARATUS FOR LOADING AND LEVELING MATERIAL INTO A CONTAINER

(71) Applicant: JDV Equipment Corporation, Dover, NJ (US)

(72) Inventor: Robert Abbott, Montville, NJ (US)

(73) Assignee: JDV Equipment Corporation, Dover, NJ (US)

( * ) Notice: Subject to any disclaimer, the term of this patent is extended or adjusted under 35 U.S.C. 154(b) by 67 days.

(21) Appl. No.: 13/626,849

(22) Filed: Sep. 25, 2012

(65) Prior Publication Data

US 2014/0083561 A1    Mar. 27, 2014

(51) Int. Cl.
*B65G 69/04*    (2006.01)

(52) U.S. Cl.
CPC .............................. *B65G 69/0433* (2013.01)

(58) Field of Classification Search
CPC .... B65G 69/0433; B65G 67/10; B65G 69/04; B60P 1/40
USPC ................................... 414/398, 399
See application file for complete search history.

(56) References Cited

U.S. PATENT DOCUMENTS

| | | | |
|---|---|---|---|
| 2,194,144 A * | 3/1940 | Gill ............................... | 209/257 |
| 3,918,604 A * | 11/1975 | Kersten ......................... | 220/530 |
| 3,944,090 A * | 3/1976 | Flood ..................... | B65G 67/04 |
| | | | 141/256 |
| 4,020,958 A | 5/1977 | Wheeler | |
| 4,266,902 A * | 5/1981 | Forsberg ....................... | 414/332 |
| 4,399,906 A * | 8/1983 | Millsap ................ | B65G 33/265 |
| | | | 110/110 |
| 4,407,622 A * | 10/1983 | Ito ................................. | 414/468 |
| 4,469,277 A * | 9/1984 | Howes ..................... | B60S 13/00 |
| | | | 180/313 |
| 4,725,184 A * | 2/1988 | Bennison ............ | B65B 69/0008 |
| | | | 414/412 |
| 5,899,319 A * | 5/1999 | Jarnagin ................ | B65G 33/32 |
| | | | 198/666 |
| 5,913,561 A * | 6/1999 | Alcorn ....................... | 296/100.1 |
| 6,095,743 A | 8/2000 | Dudley | |
| 7,669,911 B1 * | 3/2010 | Hankey ...................... | 296/100.1 |

(Continued)

FOREIGN PATENT DOCUMENTS

| | | |
|---|---|---|
| GB | 2440136 A | 1/2008 |
| JP | 60218235 A | 10/1985 |

OTHER PUBLICATIONS

JDV Level Lodor Press Release, Jul. 25, 2009, availabe at http://jdvequipment.com/Press%20Release-Level%20Lodor%20Launch.*

(Continued)

*Primary Examiner* — Mark C Hageman
(74) *Attorney, Agent, or Firm* — McDonnell Boehnen Hulbert & Berghoff LLP

(57) ABSTRACT

A material handling system is provided that allows for the even distribution and increased fill percent of a container without the need for personnel to manually even out the distribution of the material, and contains and protects material from the environment. The system deposits and levels material into an open-top container, and may include a leveler comprising a cover, a screw coupled to the cover, and a trough. The screw may be a shafted screw and the trough may be a bottomless trough. A hydraulic piston may be coupled to the cover and a support structure may both support and move the cover of the leveler.

16 Claims, 3 Drawing Sheets

(56) References Cited

U.S. PATENT DOCUMENTS

2007/0089805 A1* 4/2007 Swaan .................. F26B 17/102
                                                                                        144/1.1
2009/0099775 A1* 4/2009 Mott et al. .................... 701/300

OTHER PUBLICATIONS

European Search Report, EP Application 13185904.3-1707, dated Nov. 29, 2013.
European Search Report, EP Application 13186313.6-1707, dated Dec. 6, 2013.
Web Archive of JDV Level Lodor webpage dated Sep. 17, 2013, available at: https://web.archive.org/web/20130917052720/http://jdvequipment.com/jdv-level-lodor.
Web Archive of JDV Brochure for Level Lodor from webpage dated Apr. 20, 2015 and bearing a Revision date of Jun. 4, 2012, available at: https://web.archive.org/web/20150420213901/http://jdvequipment.com/pdf/LEVEL%20LODOR%20DATA%20SHEET%20v3.0.pdf.

* cited by examiner

APPARATUS FOR LOADING AND LEVELING MATERIAL INTO A CONTAINER

BACKGROUND

A typical overhead material handling system may be configured to both deposit and distribute flowable material into an open-topped container. This type of system may be used to handle waste material, for instance. After the container has been filled with the desired amount of material, the container may be removed from under the overhead handling system and placed on the bed of a truck or otherwise coupled to a vehicle for transportation (hauling).

A leveler is typically used to aid in the even distribution of the material as the material is being deposited, or loaded, into the container, which can be quite long in length. Some overhead material handling systems include a support structure to support and lift the leveler for ease of removal of the container.

In the instance of the deposit of hazardous materials into a container, it is desirable to evenly distribute the material without the need for personnel to be exposed to the material.

Furthermore, odor may build up within the container. It is desirable to contain the odor, as well as to prevent pests from being attracted to and entering the container and protect the container contents from the outdoor elements (e.g., snow, rain wind, and the like).

SUMMARY

This disclosure is generally directed to an apparatus and method for loading and leveling material into a disposal container.

In one aspect, an exemplary overhead material handling system includes a leveler comprising a cover, a shafted screw, and a bottomless trough. A support structure pivotally supports the cover of the leveler, and is configured to move the leveler between a raised position and a lowered position.

In another aspect, an exemplary method includes receiving material through an inlet of a conduit within a cover of a leveling system, such as a rotating a shafted screw within the conduit to direct the received material around the screw and along the container, and releasing the material through a bottom of a trough in the conduit.

In yet another aspect, an exemplary leveling apparatus includes a body portion comprising a pivoting cover, wherein the pivotable cover is coupled to at least one mechanical hoist, wherein the at least one hydraulic piston functions to pivot the pivotable cover about an axis, and wherein the at least one mechanical hoist aids in supporting the pivotable cover.

The foregoing summary is illustrative only, and is not intended to be in any way limiting. In addition to the illustrative aspects, embodiments, objectives and features described above, further aspects, embodiments, objectives and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A material handling system is provided that allows for the even distribution and increased fill percent of a container, without the need for personnel to manually even out the distribution of the material.

An exemplary embodiment provides for a system that deposits and levels material into an open-top container. The system includes a leveler comprising a cover, a shafted screw coupled to the cover, and a bottomless trough. A hydraulic and/or mechanical piston is coupled to the cover, and a support structure both supports and moves the cover.

It should be understood that the above application of an exemplary embodiment is provided for illustrative purposes, and is just one of many possible applications of an exemplary embodiment.

Figure 1:
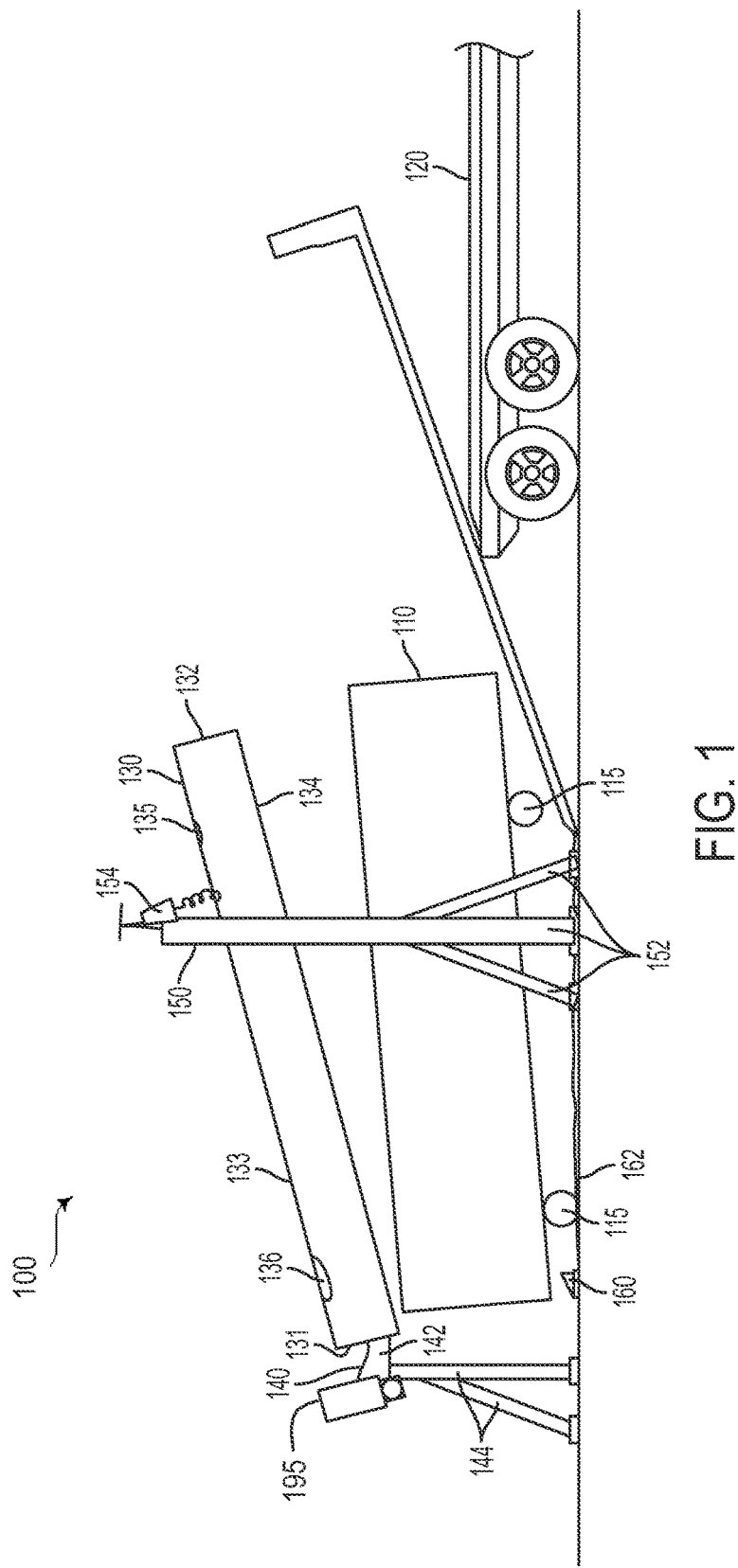
FIG. 1 is a side view of an example material handling system in a raised position as an open-top container is being deposited off of a roll-off container truck.

FIG. 1 is a side view of an example material handling system 100 in a raised position, as an open-top container 110 is being deposited off of a roll-off container truck 120.

In the example depicted in FIG. 1, the handling system 100 includes a cover 130, a mechanical lifting system such as a hydraulic system 140, and a support structure 150.

The cover 130 includes a first end 131, a second end 132, a top surface 133, and a bottom edge 134. The cover 130 could further include a shafted screw and a bottomless trough as shown and described with respect to FIG. 2. In some example embodiments, the cover 130 may comprise a fabric coated in polyvinyl chloride (pvc). In other embodiments, the cover 130 may be made from a steel, such as a stainless steel. Other materials for the cover 130 are also possible. The cover 130 allows for pest control and prevents the exposure of material within the container 130 to the exterior environment. The cover 130 also increases the safety of the personnel operating the handling system 100 as the cover 130 serves as a barrier from the afore-mentioned exposure. A vent pipe system 135 may be attached to the cover 130. The vent pipe system 135 may be attached at any number of locations, but is typically not placed directly over the screw so as to not become isolated from the container by material build up under the screw. In one example embodiment, an air and/or an odor filtration or exchange system may be coupled with the vent pipe system 135 and may include odor control features commonly used in the art. Scrubbers that pull odor from various locations and "scrub" the odor by forcing air through a vessel containing different media may be used to eliminate or mitigate odorous air build up within the container 110. Other odor filtration systems may also be used.

The cover 130 also includes at least one input 136 through which the material may be deposited. The input 136 may be an opening, orifice, port, or open chute in the cover 130. In the example embodiment depicted in FIG. 1, the input 136 is located near the first end 131. The material may be deposited into the input 136 from a feeder system (not shown). The feeder system may include a number of types of conveyors or feeder pipes known in the art to move any of the material types discussed herein.

In some examples, sensors may be positioned on the cover 130 to aid in the detection and determination of the position and movement of the cover 130. In other examples, additional ports or other openings may be present on the top surface 133 of the cover 130. The additional openings may serve as inspection holes, allowing for viewing through the cover 130. In some examples, the input 136 may serve as both an inspection hole and as a hole through which material can be fed. In some example embodiments, ultrasonic sensors may be used as level indicating devices to detect and determine the position of materials under the cover 130.

The hydraulic system 140 may include hydraulic pistons 142 that are coupled to the first end 131 of the cover 130 and are configured to pivot the cover 130 about the first end 131. FIG. 1 shows the cover 130 pivoted upwards about the axis at the first end 131, such that the second end 132 is positioned higher than the first end 131. In this position, the second end 132 is further away from the container 110, allowing the container 110 to be tilted upwards for placement onto the truck 120. A beam structure 144 supports the hydraulic system 140 and positions the hydraulic system 140 so that it can be properly coupled to the cover 130 to enable for the pivoting movement of the cover 130. A computing system advantageously executes instructions to cause the hydraulic system 140 to pivot the cover 130. Alternatively, an operator or other personnel may direct the power of the hydraulic system 140 to pivot the cover. The hydraulic system 140 may pivot the cover 130 along the various axes to position the cover in a number of different locations.

The support structure 150 is positioned a distance away from the first end 131 of the cover 130, and in some examples may be positioned near the second end 132 of the cover 130. The support structure 150 includes a support frame 152 and an attachment mechanism 154 for removable attachment to the cover 130. The attachment mechanism 154 may include at least one chain hoist or pull-cord that is attachable to at least one eyebolt or other attachment mechanism on the top surface 133 of the cover 130. In some examples, the support frame 152 may include a framework of beams, posts, and corner braces.

The sides of the trough may extend past a drive unit at the first end 131 so that the hydraulic pistons 142 are attachable to the base structure 144 and pull the cantilevered portion of the support frame 152 toward the base structure 144, causing the cover 130 raise off the container.

The container 110 may be any open-top container, and may include wheels and a hitch at either end to facilitate transportation on and off of the roll-off container truck 120 or another vehicle. The material to be deposited into the container may be any flowable (e.g., loose) material. In some examples, the material may be scrap pieces. In other examples, the material may be a biomaterial such as sludge or dirt. Still other flowable materials may be used with the handling system 100.

The roll-off container truck 120 may be any standard roll-off container truck known in the art. In an alternative example, the truck may comprise a vehicle towing a bed on which the container 110 may be loaded. Still other alternative examples may be envisioned.

In the example shown in FIG. 1, the hydraulic system 140 has pivoted the first end 131 of the cover 130 about its axis, such that the second end 132 is higher than the first end 131. The support structure 150 may provide additional support in lifting the second end 132 of the container 130.

The handling system 100 may further include a guide rail 160 and a stopping plate 162 for ease of positioning the container 110 under the cover 130.

Figure 2:
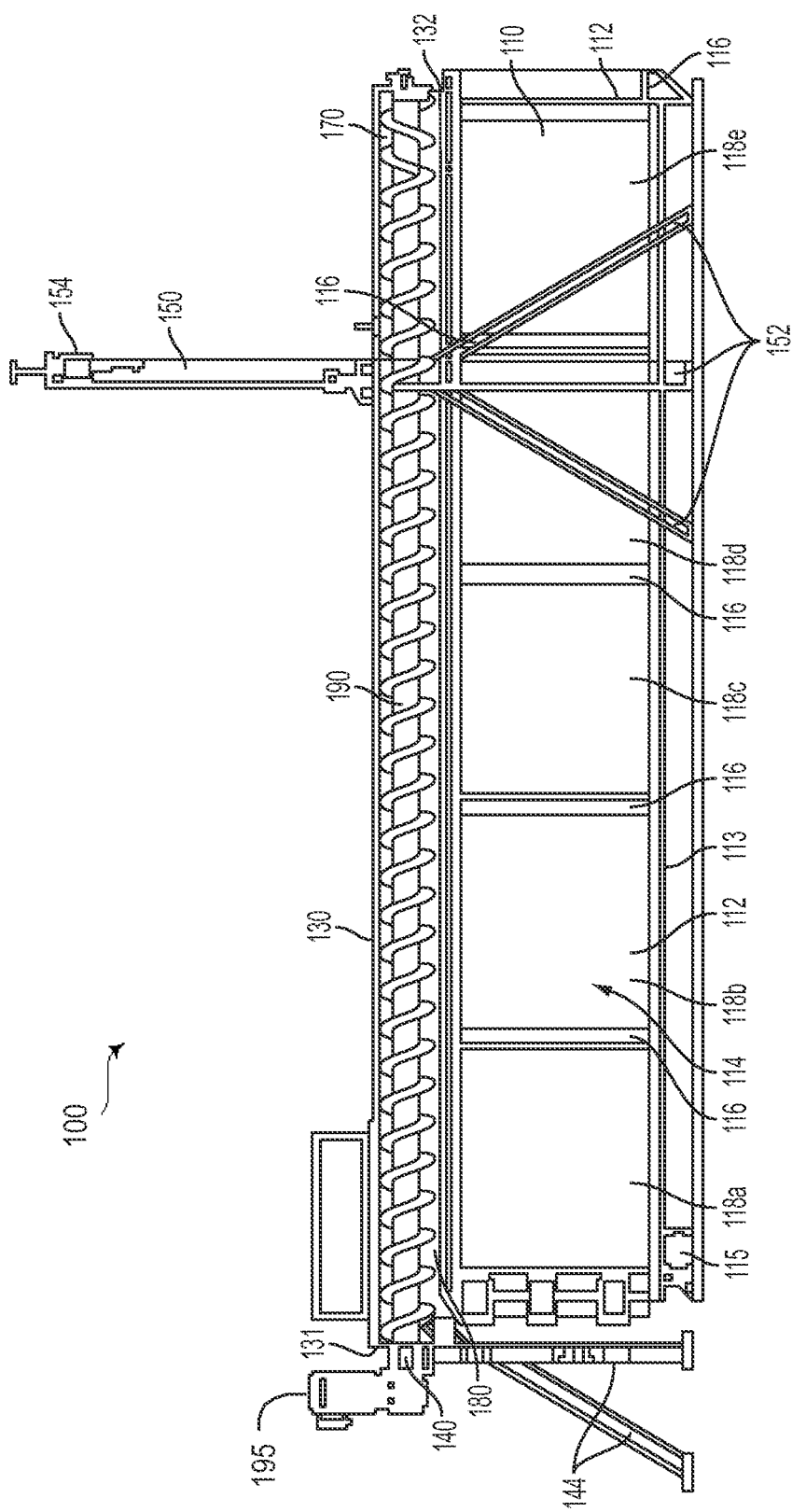
FIG. 2 is a cross-sectional view of the material handling system of FIG. 1 along its length, wherein the cover is parallel to the container and material is being deposited into the container.

FIG. 2 is a cross-sectional view of the scrap handling system 100 of FIG. 1, wherein the cover 130 is parallel to the container 110 and material is in the process of being deposited into the container.

As shown in FIG. 2, the container 110 may include side walls 112 and a bottom 113 that define an interior 114, wherein the interior is an upwardly open space, and may further include vertical separators 116 within the open interior 114, creating compartments 118a-118e. The container 110 includes wheels 115 attached to the bottom 113.

In FIG. 2, a conduit 170 within the cover 130 comprises a bottomless trough 180 and a shafted screw 190 is positioned within the conduit 170.

The shafted screw 190 is coupled to a drive unit 195. The drive unit 195 powers the shafted screw 190 such that the shaft rotates. The drive unit 195 has a motor and drive mounted to one end of the cover 130 for rotating the shafted screw 190. The shaft may be present as a structural support to the screw portion in the absence of any bottom surface under the screw portion. In some examples, the shaft may be in the range of 4-6 inches in diameter. Bearings may be present at each end of the shaft. The screw portion may include a spiral flange adapted to move material in a particular direction through the conduit 170 as the shafted screw 190 is rotated.

In some examples, the conduit 170 may be made from a rigid, galvanized metal. The bottomless trough 180 feature allows for all of the material to simply fall into the container 110 after the material flows around the shafted screw 190. Thus, in contrast to a traditional u-trough with multiple openings, material will not tend to get caught in parts of the trough bottom, allowing for a more efficient flow of material.

Figure 3:
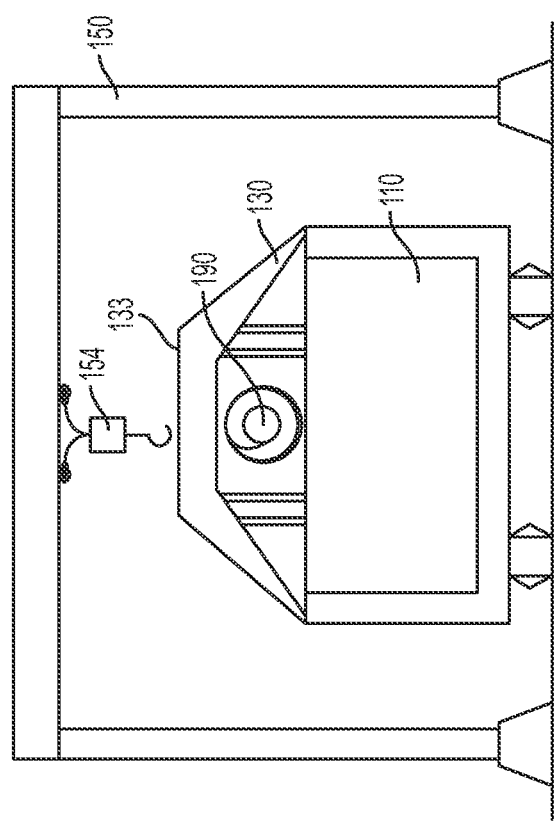
FIG. 3 is a cross-sectional end view of the material handling system of FIG. 1 along its width, wherein the cover is parallel to the container.

FIG. 3 is a cross-sectional view across the width of the scrap handling system 100 of FIG. 1. The position of the shafted screw 190 is shown within the conduit 170. The support structure 150 with attachment mechanism 154 is also shown. As shown in FIG. 3, in some example embodiments the sides of the cover 130 may be angled.

In operation, material is fed from a feeder through the input 136 on the cover 130, and flows around the shafted screw 190, falling through the bottomless trough 180 into a compartment in the container 110. Once the material has filled the first compartment 118a of the compartments 118, located closest to and under the input 136, the deposited material forms a pile that supports additional material against the screw portion of the shafted screw 190. The screw portion of the shafted screw 190 then pushes any additional incoming material past the first compartment, and into the second compartment of the compartments 118. This process is repeated such that when a compartment becomes filled with material, the screw portion of the shafted screw 190 continues to push additional material along the length of the conduit 170 into the next compartment 118 that has room to accommodate the material. The rotating shafted screw 190 thus serves to incrementally fill the container 110, ensuring that the container 110 is filled to capacity and the material deposited is generally evenly distributed within the container 110.

When the container 110 is filled with the desired amount of material or to capacity (this can be determined by using the inspection holes previously discussed, by using sensor technology or other alternative means), the flow of material is stopped and the cover 130 is lifted using either the hydraulic system 140, the support system 150, or both, and the container 110 is moved onto a bed of a truck or other vehicle. Another container may then be placed under the handling system 100, and the cover 130 may be lowered to position the handling system 100 to again deposit material into the container.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

I claim:

1. An overhead material handling system comprising:
    a leveler comprising a cover defining an interior, the cover interior comprising an uninterrupted volume including a bottomless trough, and a shafted screw having a shaft and a screw portion positioned within the cover interior;
    a support structure pivotally supporting the cover of the leveler and configured to move the leveler between a raised position and a lowered position thereby positioning the leveler substantially parallel to a container;
    a plurality of inspection holes formed through a top surface of the cover; and
    a guide rail and a stopping plate configured to position the container under the cover;
    wherein the uninterrupted volume of the cover spans the opening of the container when in the lowered position.

2. The system of claim 1, further comprising at least one mechanical lifting mechanism coupled to the cover.

3. The system of claim 2, wherein the at least one mechanical lifting mechanism is at least one hydraulic piston configured to power the movement of the cover.

4. The system of claim 3, wherein the at least one mechanical lifting mechanism is coupled to a first end of the cover and pivots the cover at a pivot point at the first end.

5. The system of claim 1, further comprising a vent system attached to the cover that is configured to reduce odor buildup from within the container.

6. The system of claim 1, wherein the cover is a steel cover.

7. The system of claim 6, wherein the shafted screw is removably attached to a drive unit.

8. A method comprising:
    positioning a container under a cover via a guide rail and a stopping plate;
    receiving material through an inlet into an uninterrupted volume within the cover of a leveling system, the uninterrupted volume spanning the width of the cover;
    rotating a shafted screw, having a shaft and a screw portion, within the volume to direct the received material around the shafted screw;
    releasing the material through an open bottom of the volume;
    filling a first compartment of the container with the material;
    pushing additional material past the first compartment and into a second compartment within the container; and
    detecting cover movement and orientation.

9. The method of claim 8, wherein rotating the shafted screw further comprises powering the rotation via a drive unit coupled to the shafted screw.

10. The method of claim 8, further comprising:
    raising at least a portion of the cover of the leveling system such that the cover is in a raised position;
    positioning an open-top container in an area under the cover; and
    moving the cover to a lowered position, wherein in the lowered position the cover is situated to deposit the released material into the open-top container.

11. The method of claim 10, wherein raising the at least a portion of the cover comprises hydraulic pistons pushing against one end of the cover.

12. The method of claim 10, wherein raising the at least a portion of the cover comprises an overhead framework with a lifting mechanism pulling the at least a portion of the cover upwards.

13. A leveling apparatus for distributing and leveling material comprising:
    a body portion comprising a removable cover, wherein the removable cover is coupled to at least one hydraulic piston and wherein the at least one hydraulic piston functions to pivot the removable cover about an axis, the removable cover defining an uninterrupted volume thereunder extending from one side of the cover to the opposite side; and
    a plurality of inspection holes formed through a top surface of the removable cover; and
    a shafted screw, having a shaft and a screw portion and being positioned within the volume under the cover, wherein the shafted screw is removably attached to a drive unit.

14. The leveling apparatus of claim 13, further comprising a support structure pivotally supporting the cover and configured to move the leveler between a raised position and a lowered position positioning the leveler substantially parallel to a container.

15. The leveling apparatus of claim 13, further comprising a vent system attached to the cover that is configured to reduce odor buildup from within the container.

16. The leveling apparatus of claim 13, wherein the cover is removable.

* * * * *